United States Patent [19]
Jusionis

[11] Patent Number: 5,710,403
[45] Date of Patent: Jan. 20, 1998

[54] ORBITAL WELDHEAD WITH INTEGRAL COOLING

[76] Inventor: Vytautas John Jusionis, 5302 Clark Cir., Westminister, Calif. 92683

[21] Appl. No.: 732,658

[22] Filed: Oct. 15, 1996

[51] Int. Cl.[6] .................................................. B23K 9/12
[52] U.S. Cl. ........................ 219/60 A; 219/125.11; 219/137.62
[58] Field of Search ................... 219/60 A, 125.11, 219/137.62, 61

[56] References Cited

U.S. PATENT DOCUMENTS

| | | | |
|---|---|---|---|
| D. 297,144 | 8/1988 | Kazlauskas | D15/144 |
| 3,238,347 | 3/1966 | Rohrberg et al. | 219/60 |
| 3,395,262 | 7/1968 | Kazlauskas | 219/60 A |
| 3,688,069 | 8/1972 | Kazlauskas | 219/60 A |
| 3,780,254 | 12/1973 | Rygiol | 219/61 |
| 4,009,360 | 2/1977 | Beetham | 219/60 A |
| 4,019,016 | 4/1977 | Friedman et al. | 219/125 R |
| 4,038,509 | 7/1977 | Henderson et al. | 219/60 A |
| 4,047,656 | 9/1977 | McCombs | 228/27 |
| 4,080,525 | 3/1978 | Gobetz | 219/121 L |
| 4,132,338 | 1/1979 | Bove et al. | 228/27 |
| 4,161,640 | 7/1979 | Bromwich et al. | 219/60 A |
| 4,168,406 | 9/1979 | Torrani | 219/60 A |
| 4,243,868 | 1/1981 | Graham | 219/125.11 |
| 4,365,132 | 12/1982 | Kazlauskas et al. | 219/60 A |
| 4,373,125 | 2/1983 | Kazlauskas | 219/60 A |
| 4,379,215 | 4/1983 | Rohrberg | 219/60 A |
| 4,379,963 | 4/1983 | Kazlauskas | 219/136 |
| 4,408,112 | 10/1983 | Kazlauskas | 219/61 |
| 4,427,868 | 1/1984 | Kazlauskas | 219/60.2 |
| 4,476,367 | 10/1984 | Kazlauskas | 219/60.2 |
| 4,538,046 | 8/1985 | Kazlauskas | 219/125.1 |
| 4,554,429 | 11/1985 | Kazlauskas | 219/60.2 |
| 4,556,774 | 12/1985 | Kazlauskas | 219/60.2 |
| 4,649,250 | 3/1987 | Kazlauskas | 219/60 A |
| 4,650,959 | 3/1987 | Swensrud et al. | 219/125.1 |
| 4,687,899 | 8/1987 | Acheson | 219/76.14 |
| 4,703,698 | 11/1987 | Kazlauskas | 105/29.1 |
| 4,716,271 | 12/1987 | Hulsizer et al. | 219/125.11 |
| 4,726,300 | 2/1988 | Kazlauskas | 104/118 |
| 4,810,848 | 3/1989 | Kazlauskas | 219/60 A |
| 4,841,115 | 6/1989 | Severin et al. | 219/60 A |
| 4,841,118 | 6/1989 | Overbay | 219/124.03 |
| 4,841,123 | 6/1989 | Novak et al. | 219/125.12 |
| 4,857,690 | 8/1989 | Kazlauskas | 219/60 A |
| 4,880,956 | 11/1989 | Mazoyer | 219/60 A |
| 4,892,990 | 1/1990 | Acheson | 219/76.14 |
| 4,896,812 | 1/1990 | Kazlauskas | 228/32 |
| 4,939,337 | 7/1990 | Gente | 219/125.11 |
| 4,952,769 | 8/1990 | Acheson | 219/76.14 |
| 5,040,716 | 8/1991 | Stetz | 2328/49.3 |
| 5,136,134 | 8/1992 | Benway et al. | 219/60 A |
| 5,196,664 | 3/1993 | McGushion | 219/60 A |
| 5,220,144 | 6/1993 | Jusionis | 219/60 A |
| 5,221,818 | 6/1993 | Jusionis et al. | 219/61 |
| 5,223,686 | 6/1993 | Benway et al. | 219/60 A |
| 5,277,744 | 1/1994 | Snyder | 156/580 |
| 5,288,963 | 2/1994 | Jusionis | 219/60 A |
| 5,304,776 | 4/1994 | Buerkel et al. | 219/125.11 |
| 5,310,982 | 5/1994 | Jusionis | 219/61 |
| 5,378,951 | 1/1995 | Snyder | 310/17 |
| 5,422,456 | 6/1995 | Dahm | 219/121.63 |
| 5,428,198 | 6/1995 | Peigney et al. | 219/61 |

OTHER PUBLICATIONS

Exel Design Co., "Orbital Welding Technology" brochure, (1993) 7 pages.

*Primary Examiner*—Clifford C. Shaw
*Attorney, Agent, or Firm*—Christie, Parker & Hale, LLP

[57] ABSTRACT

An orbital weldhead having minimum thickness incorporates integral cooling and includes a nonconductive housing having a circular aperture for insertion and removal of the workpiece. A nonconductive self-lubricating race is mounted in the housing and surrounds the aperture, and an integral cover adapted to mate with the housing incorporates a nonconductive outer body and an electrode plate secured to the body adjacent the nonconductive race. The electrode plate includes a machined coolant flow channel engaging the nonconductive body of the cover to form a coolant flow channel surrounding the aperture.

12 Claims, 12 Drawing Sheets

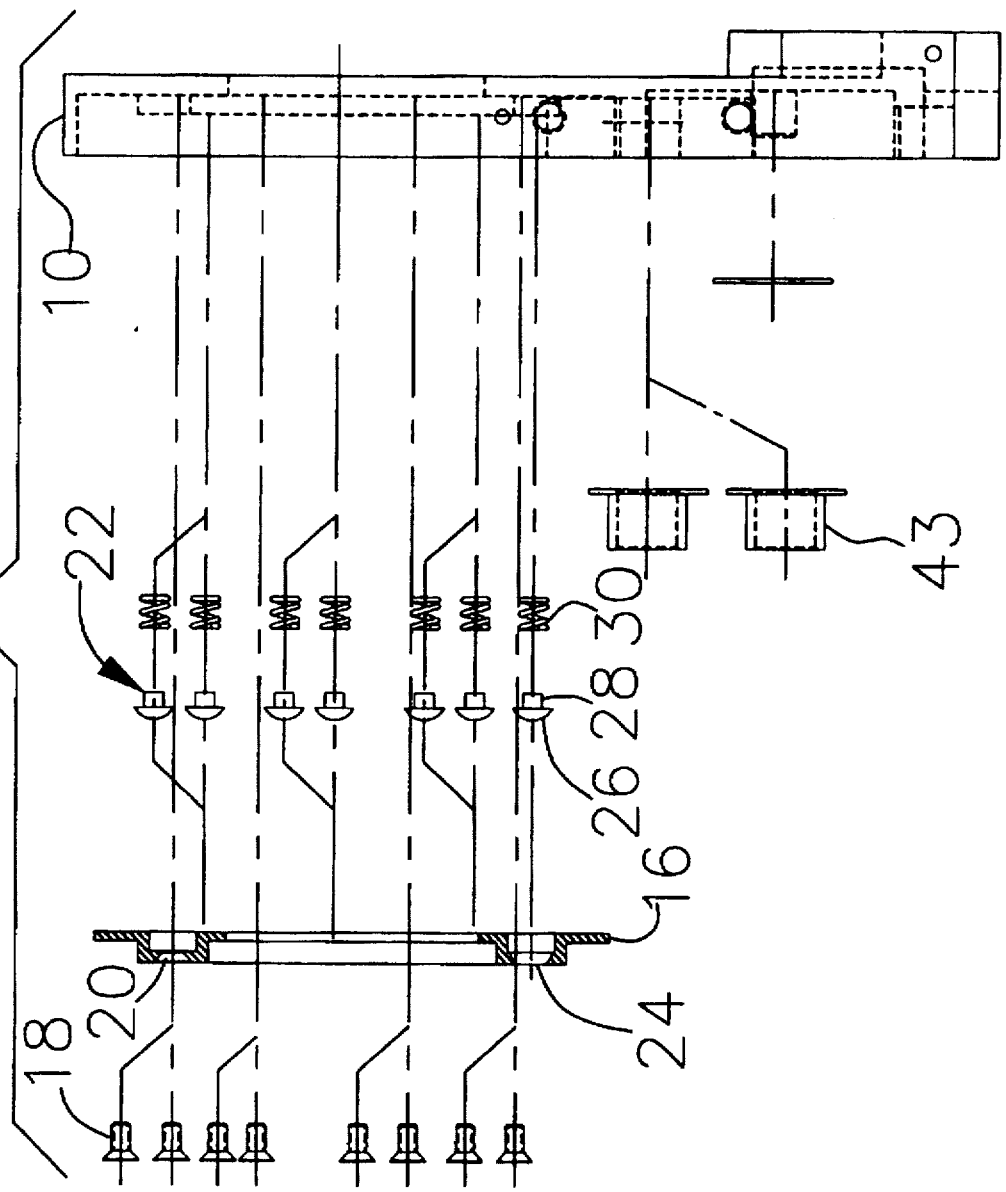

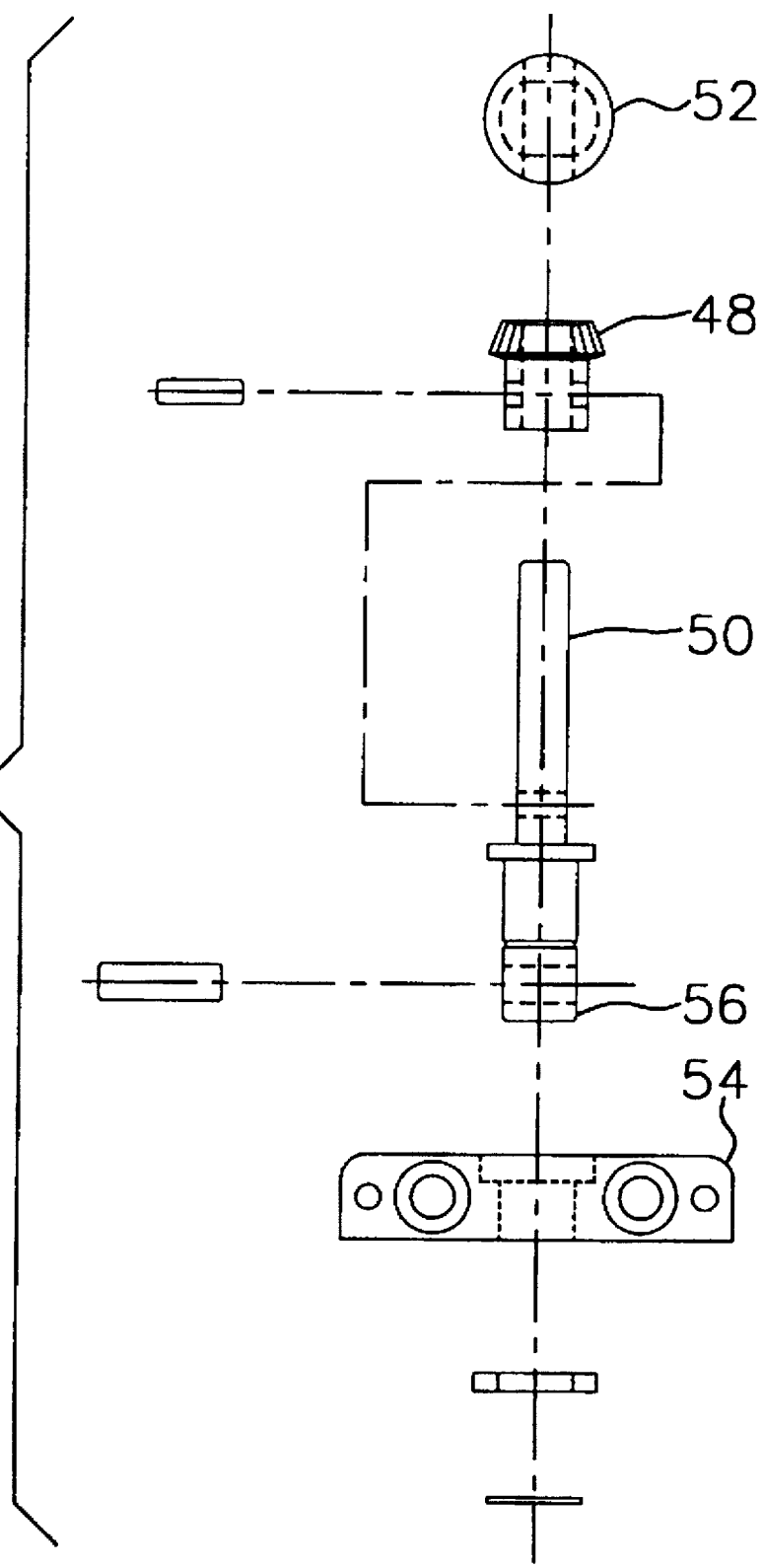

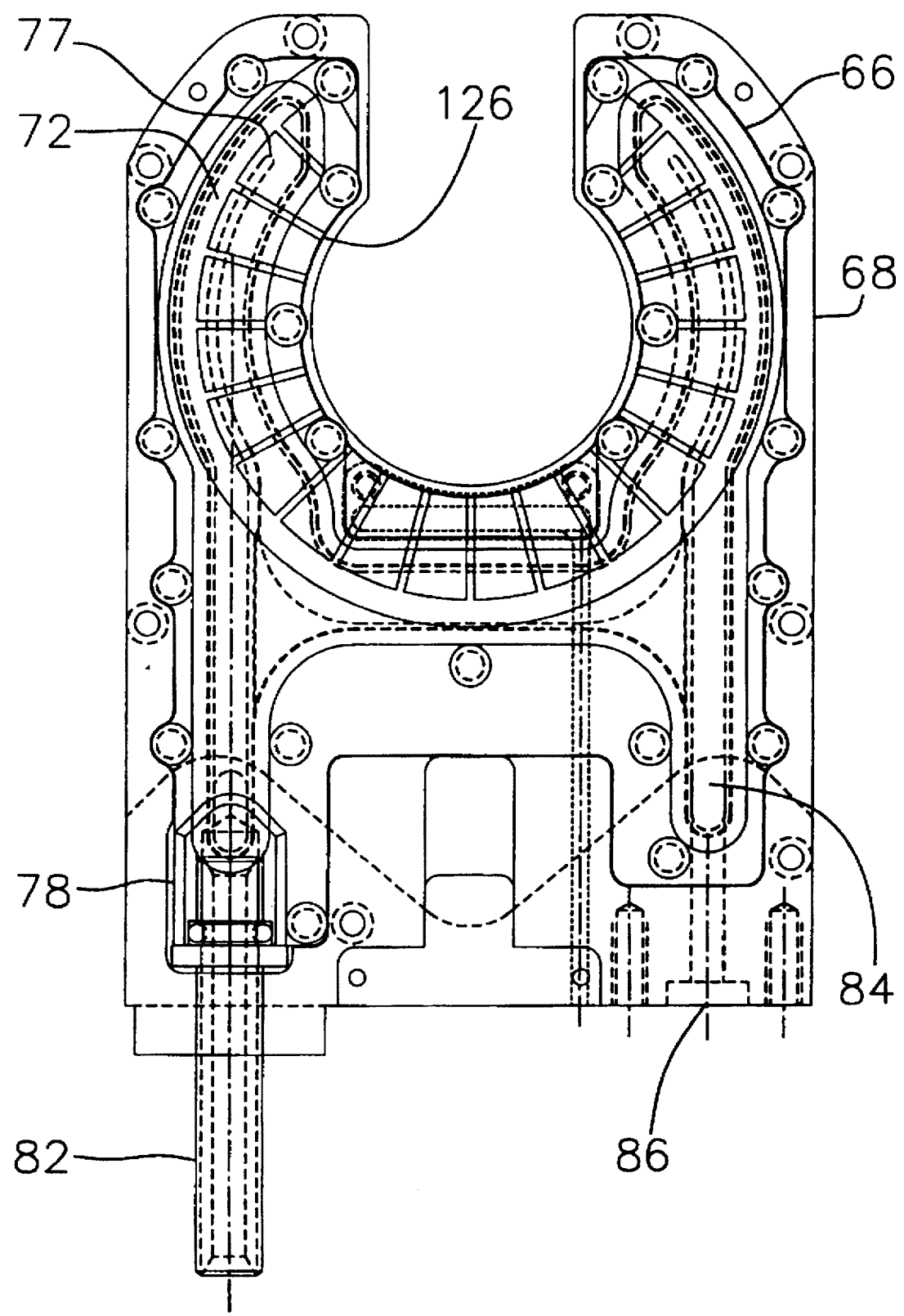

ORBITAL WELDHEAD WITH INTEGRAL COOLING

FIELD OF THE INVENTION

The present invention relates to self-contained orbital weldheads having a reduced size for operation within confined spaces. More particularly the invention provides an orbital weldhead having a weldhead body with a sandwiched plastic cover and metallic electrode with internally machined coolant passages and improved resilient rotor contact devices for reduced cross sectional area. Additionally, the rotor drive train incorporates a captured shaft design producing better alignment and reduced wear.

DISCUSSION OF RELATED ART

Orbital weldheads for use in gas tungsten arc welding (GTAW) provide the greatest flexibility and accuracy in welding tubular joints for a variety of applications. While present orbital weldheads incorporate a significantly reduced cross section and device width for use in confined work spaces, it is desirable to obtain the minimum weldhead width and thickness for current GTAW applications. Cooling of the weldhead is imperative to achieve high production rates with consistent weldhead reliability and maintainability. Consequently, it is desirable to provide an integrated cooling design minimizing the size and complexity of the weldhead design.

SUMMARY OF THE INVENTION

The present invention provides an orbital weldhead having minimum thickness which incorporates integral cooling. The construction of the weldhead includes a nonconductive housing having a circular workpiece aperture with an open arc in the housing for insertion and removal of the workpiece. A nonconductive self-lubricating race is mounted in the housing surrounding the workpiece aperture and an integral cover adapted to mate with the housing incorporates a nonconductive outer body and an electrode plate secured to the body adjacent the nonconductive race. The electrode plate includes a machined coolant flow channel which engages the nonconductive body of the cover to cooperatively form a coolant flow channel surrounding the workpiece aperture. A rotor carrying the welding cathode is engaged between the race and electrode plate. The rotor is substantially circular with an open arc segment which aligns with the open arc segments of the housing, cover, race and electrode when the rotor is placed in a home position thereby allowing insertion and removal of the workpiece.

Multiple dome-headed plungers are spring mounted and constrained between the race and housing with the periphery of the dome protruding through apertures in the race to contact the rotor, urging the rotor against the electrode for firm electrical contact and mechanical alignment. A main bevel and spur gear and associated spur drive gears interoperably engage the rotor and are driven by a captured shaft gear assembly incorporating a bevel drive gear mounted on a shaft terminating in a bearing mounted on the axis of the bevel and spur gear and constrained opposite the bevel drive gear by a bearing mounted to the housing. Drive attachment for the shaft is accomplished through a combination of pinned connections providing a universal joint precluding transverse loading of the shaft mounted bevel drive gear and, consequently, the remainder of the drive train.

Power to the electrode is provided through a cooling water fitting attached to the electrode plate further reducing parts count and complexity of the weldhead.

BRIEF DESCRIPTION OF THE DRAWINGS

The details of an embodiment of the present invention in an orbital weldhead will be more clearly understood with reference to the following detailed description and drawings wherein;

FIG. 1c is an exploded side view of the nonconductive housing subassembly shown in FIG. 1a;

FIG. 2 is an exploded side view of the nonconductive housing and nonconductive self-lubricating race demonstrating details of the dome headed plunger mounting arrangement for the race;

FIG. 3 is a detailed view of the captured shaft drive assembly;

FIG. 5b is a top view of the assembled electrode plate and body of FIG. 5a;

DETAILED DESCRIPTION

Figure 1A:
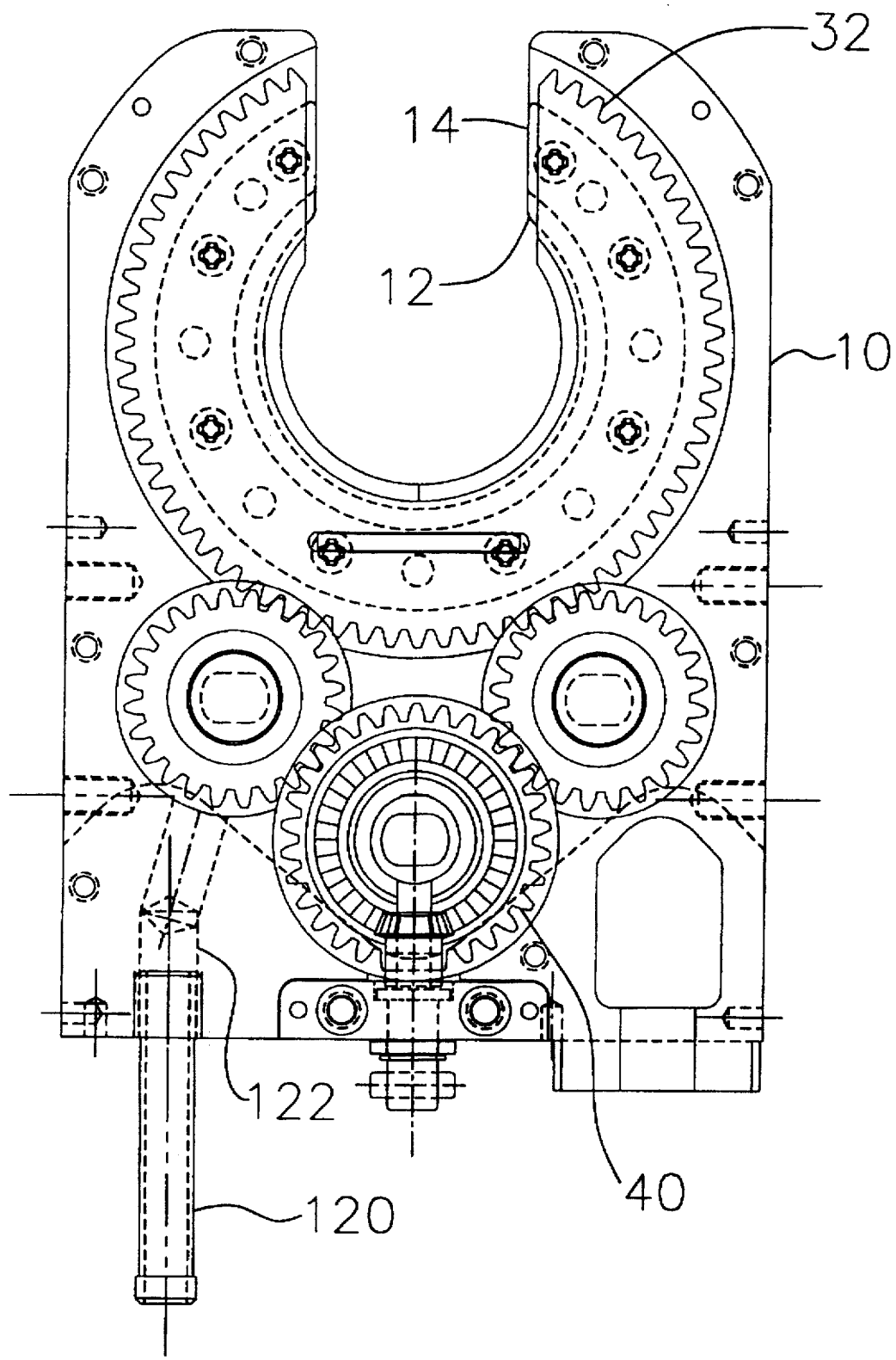
FIG. 1a is a top view of the nonconductive housing, rotor and drive gear sub-assembly for the present invention.
Figure 1B:
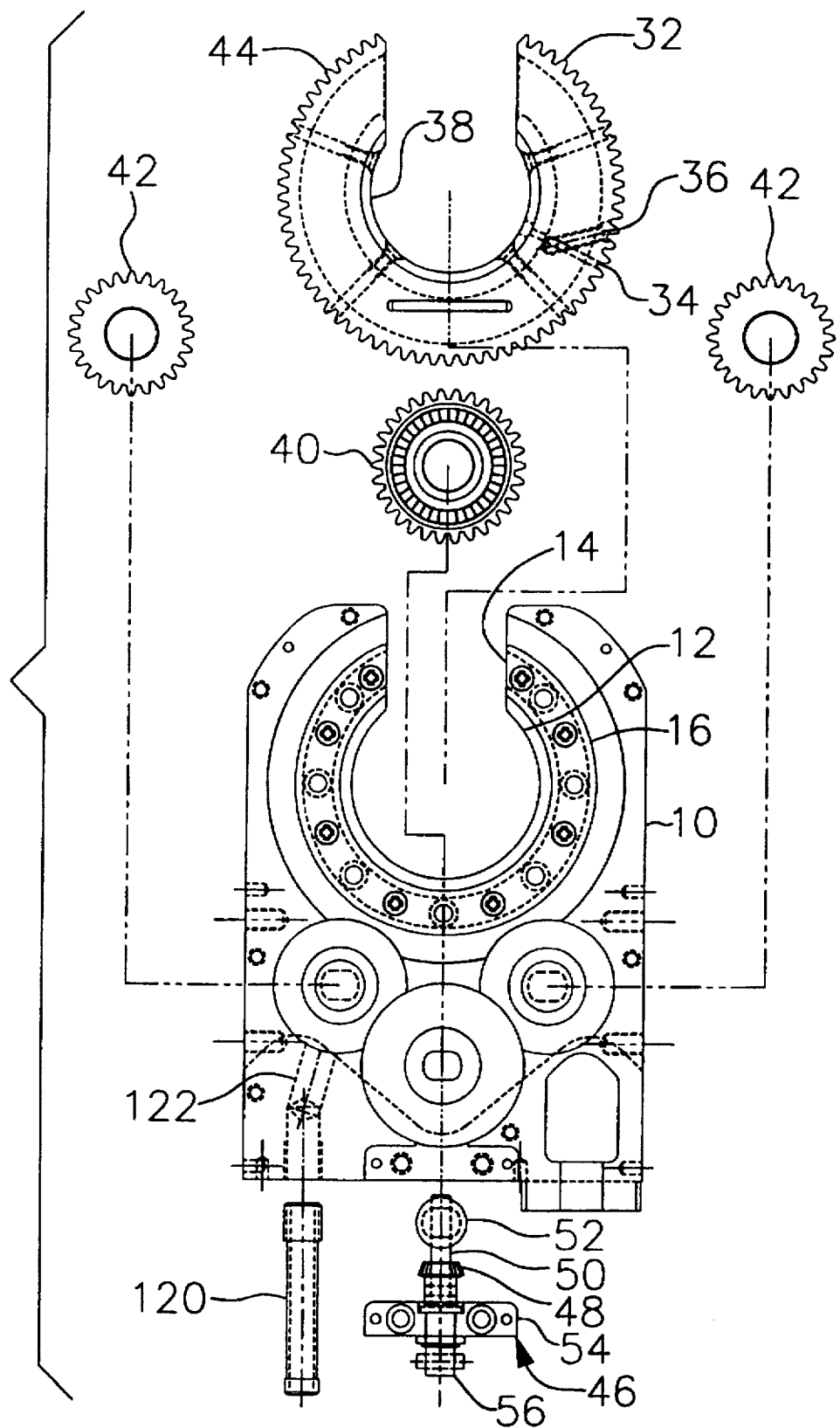
FIG. 1b is a partially exploded view of the nonconductive housing assembly of FIG. 1a showing the rotor and drive gears in detail.
Figure 1C:
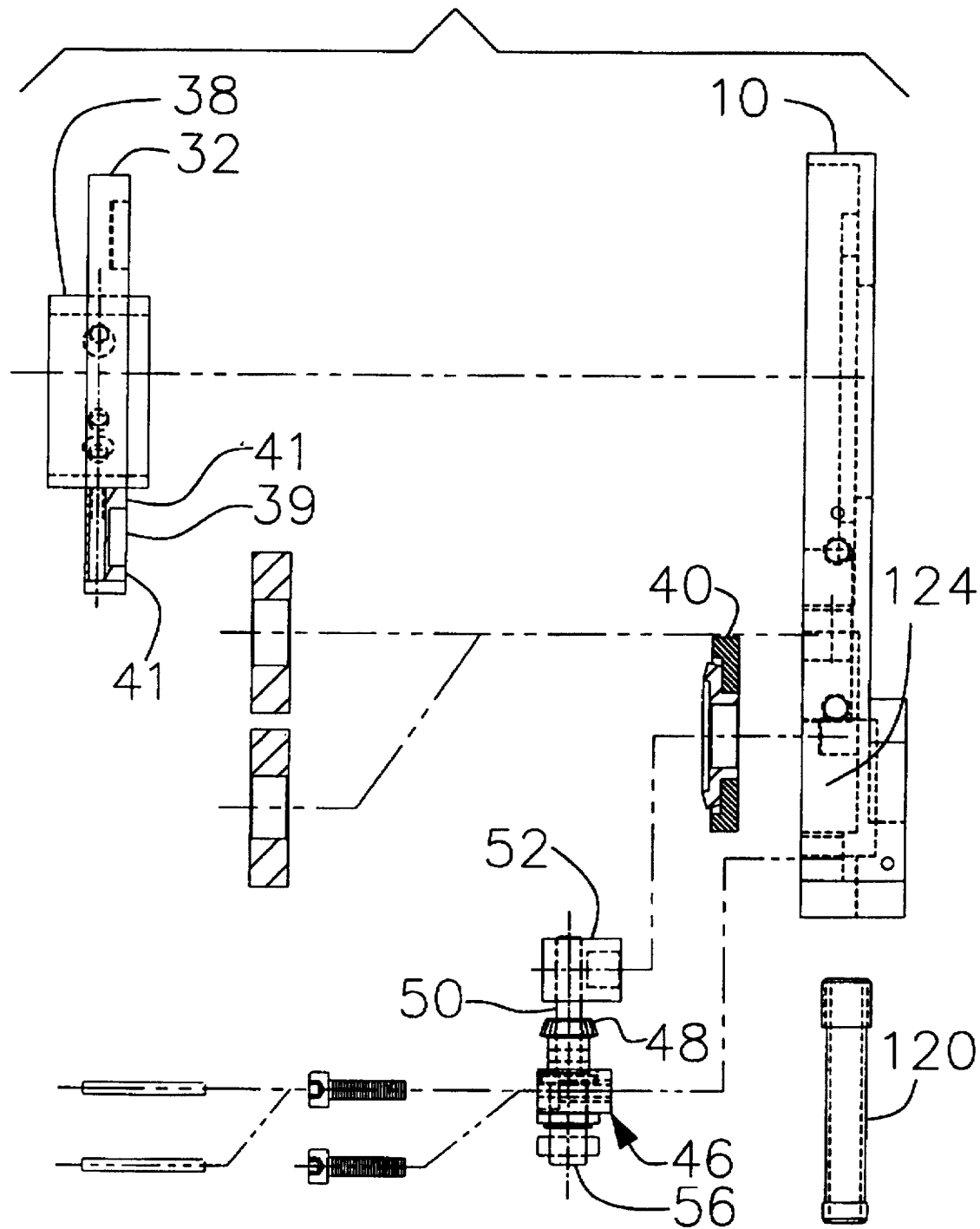

Referring to the drawings, FIGS. 1a–c display the nonconductive housing with the nonconductive self-lubricating race and rotor drive mechanism of the present invention. As best seen in the exploded views of FIG. 1b and 1c, the nonconductive housing 10 incorporates a circular workpiece aperture 12 having an open arc segment or bight portion 14 allowing for insertion and removal of the workpiece from the weldhead. A nonconductive self-lubricating race 16 is mounted to the nonconductive housing as best seen in FIG. 2. A plurality of mounting screws 18 are inserted through mounting holes 20 spaced evenly around the race. The screws are received in appropriately tapped holes in the nonconductive housing. A plurality of dome-headed spacers 22 are constrained between the race and nonconductive housing. Hemispherical apertures 24 receive the domed head 26 of the plunger allowing the peripheral surface of the dome to extend through the aperture while constraining the plunger against the beveled inner surface of the aperture. The domed head 26 is attached to a plunger shaft 28 which is concentrically received within springs 30 constrained between the domed head and the nonconductive housing. The springs urge the plungers outwardly through the aperture for engagement of the rotor 32, as will be described in greater detail subsequently.

The race and rotor incorporate substantially circular workpiece apertures which coincide with the workpiece aperture provided in the nonconductive housing. Each element incorporates an open arc segment or bight portion which aligns with the open bight portion of the housing with the rotor oriented in a home position. A sensor in the housing and home sense magnet in the rotor provide control feedback for orienting the rotor in the home position. The rotor incorporates a cathode bore 34 which receives the welding cathode (not shown). A set screw inserted in angled bore 36 constrains the cathode within the rotor. In addition, an arc shield 38 is mounted to the rotor for protection of other weldhead components.

Rotation of the rotor is accomplished through a gear train employing a bevel and spur gear 40 rotationally mounted on the nonconductive housing adjacent the rotor race. Two spur drive gears 42 driven by the bevel and spur gear assembly contact the gear teeth 44 on the peripheral edge of the rotor to drive the rotor during welding operations. Bushings 43 best seen in FIG. 2 mounted in the nonconductive housing provide the bearings for the spur gears.

Figure 4:
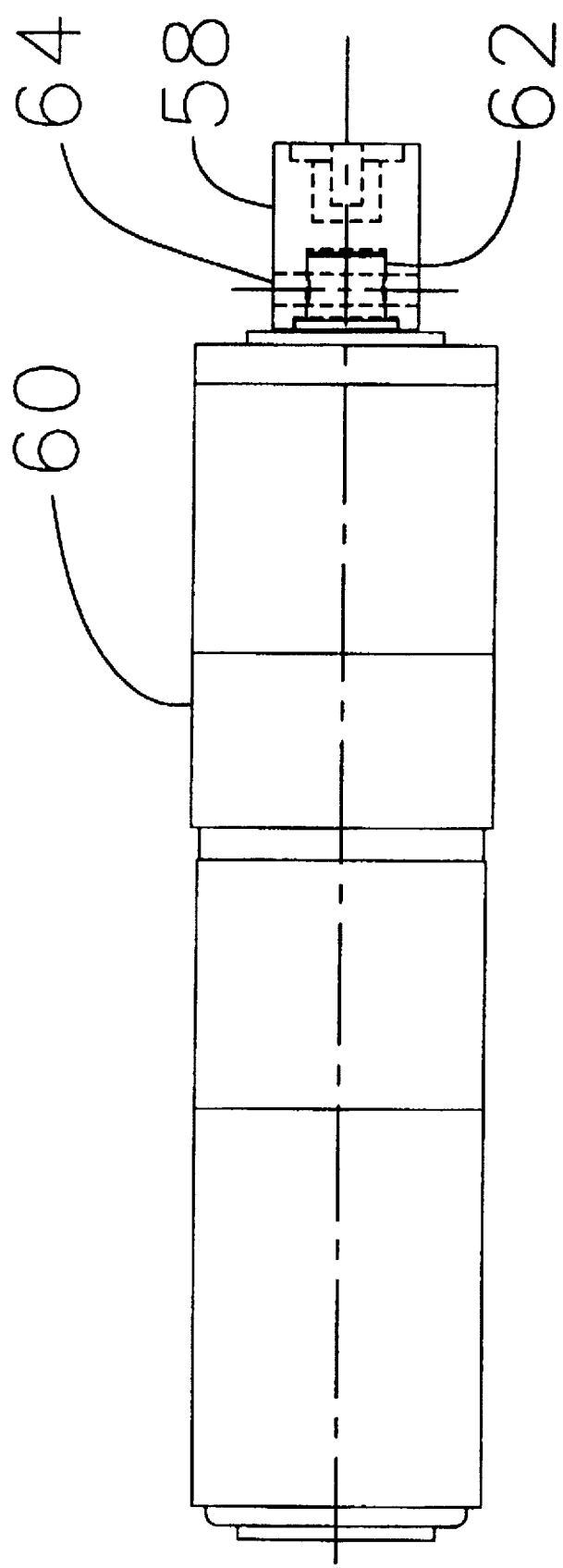
FIG. 4 is a side view of the drive motor and shaft coupler.

To avoid transverse loading of the bevel and spur gear assembly during operation of the weldhead, a captured shaft gear assembly 46 is employed. Details of the captured shaft gear assembly are shown in FIG. 3. A bevel drive gear 48 for contact with the bevel gear portion of the bevel and spur gear assembly is mounted and staked to a shaft 50. At a first end, the shaft is received in a bearing block 52 which is mounted concentric with the axis of rotation for the bevel and spur gear assembly. The shaft is constrained near the opposing end by a bearing block 54 which is mounted to the nonconductive housing adjacent the drive gear train. The shaft is thereby constrained on both sides of the bevel drive gear maintaining the bevel drive gear in firm contact with the bevel and spur gear assembly. The shaft terminates in a pinned connection 56 which is received within a nonconductive coupler 58 best seen in FIG. 4. A gear drive motor 60 provides a drive shaft 62 which is received in an end of the nonconductive coupler opposite the captured shaft carrying the bevel drive gear. The motor drive shaft is also received in a pinned connection with the coupler, having an axis of rotation displaced 90° from the axis of rotation in the pinned coupling for the captured shaft.

The double pinned coupling reduces loading of the captured shaft by any misalignment of the motor and provides high voltage isolation of the motor from the gear drive train, while the bearing blocks constraining the captured shaft preclude the transverse loading of the bevel drive gear thereby providing maximum stability for the overall gear train of the weldhead.

Figure 5A:
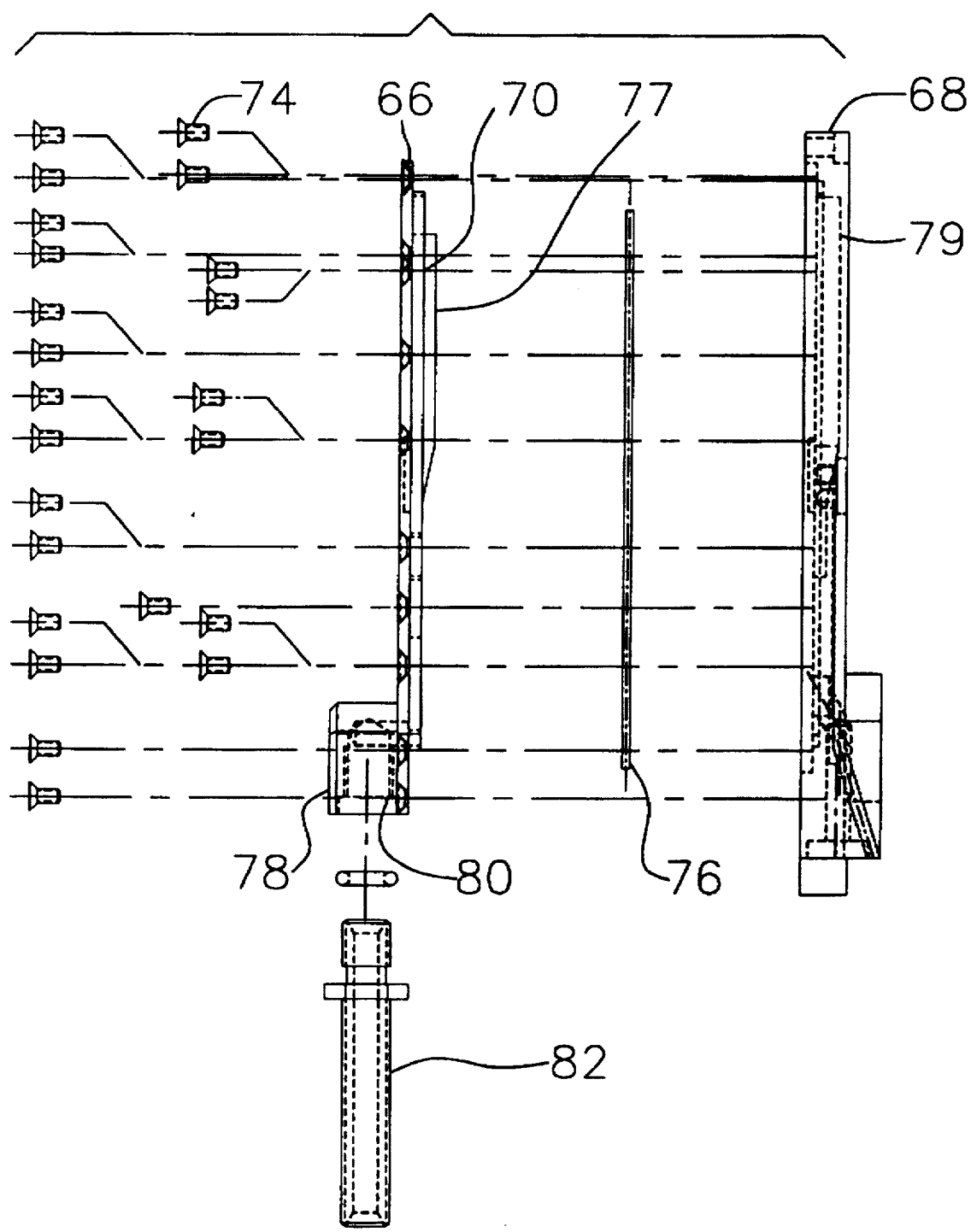
FIG. 5a is a side exploded view of the nonconductive body and nonconductive electrode plate.
Figure 5C:
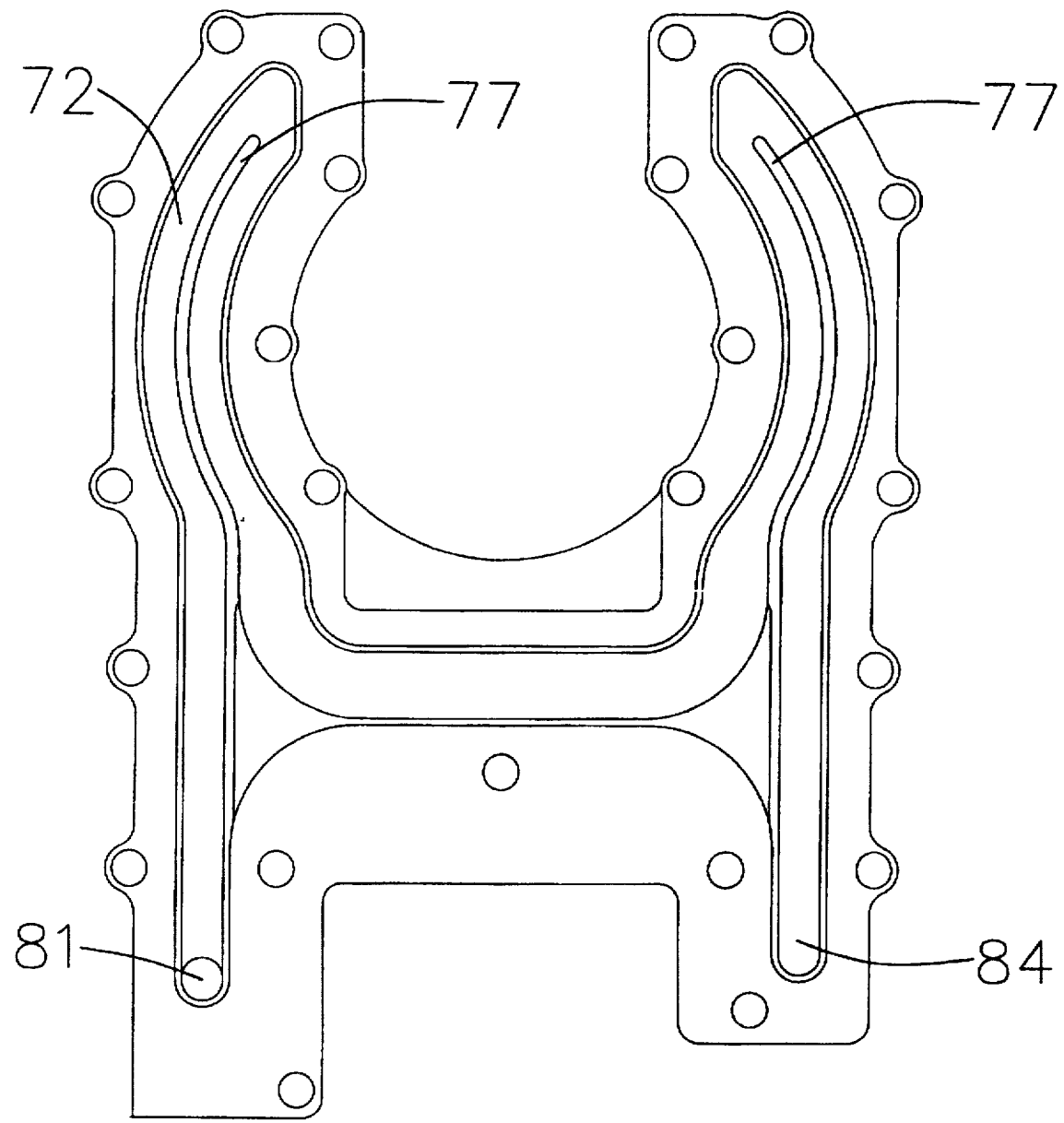
FIG. 5c is a detailed view of the mating surface of the electrode plate showing the coolant flow channels.

An electrode plate 66 best seen in FIGS. 5a and 5b is received in a nonconductive body 68 which provides the mating closure to the nonconductive housing. The contact surface 70 for the electrode with the nonconductive body incorporates one or more machined fluid channels 72, best seen in FIG. 5C. The electrode for the embodiment shown in the drawings is mounted to the nonconductive body employing a plurality of screws 74 and a resilient seal 76 surrounds the periphery of the mating surfaces of the nonconductive body and electrode plate. The channel of the electrode is connected through an orifice in the electrode to a boss 78 which incorporates an internal bore 80 receiving a bored fitting 82 with an O-ring seal. The fitting connected to the electrode plate and provides an inlet for coolant as well as an electrical connection (cathode) to the weldhead assembly, which flows from bore 80 through interconnecting aperture 81 and through the channel in the electrode plate intermediate the plate and nonconductive body.

The resilient seal provides a seal around the periphery of the coolant channel. In the embodiment shown in the drawings, the coolant channel incorporates a loop back providing a continuous flow path around the exterior of the weldhead and interior of the weldhead adjacent the workpiece aperture. A wall 77 intermediate the two portions of the channel extends into a mating slot 79 in the nonconductive body to form the internal fluid seal for the coolant flow channel. For the embodiment shown in the drawings, the raised wall portion extends sufficiently into the nonconductive housing in a press fit arrangement to preclude excessive cross flow between the machined cooling channels which would reduce the effectiveness of the coolant flow.

Figure 6A:
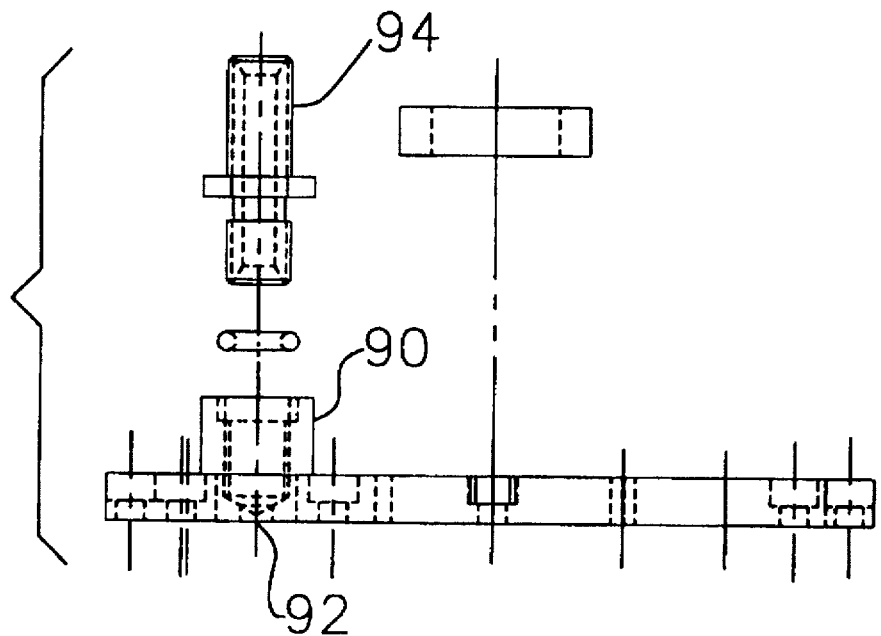
FIG. 6a is a top exploded view of the butt plate and combined anode (ground)/coolant flow fitting.
Figure 6B:
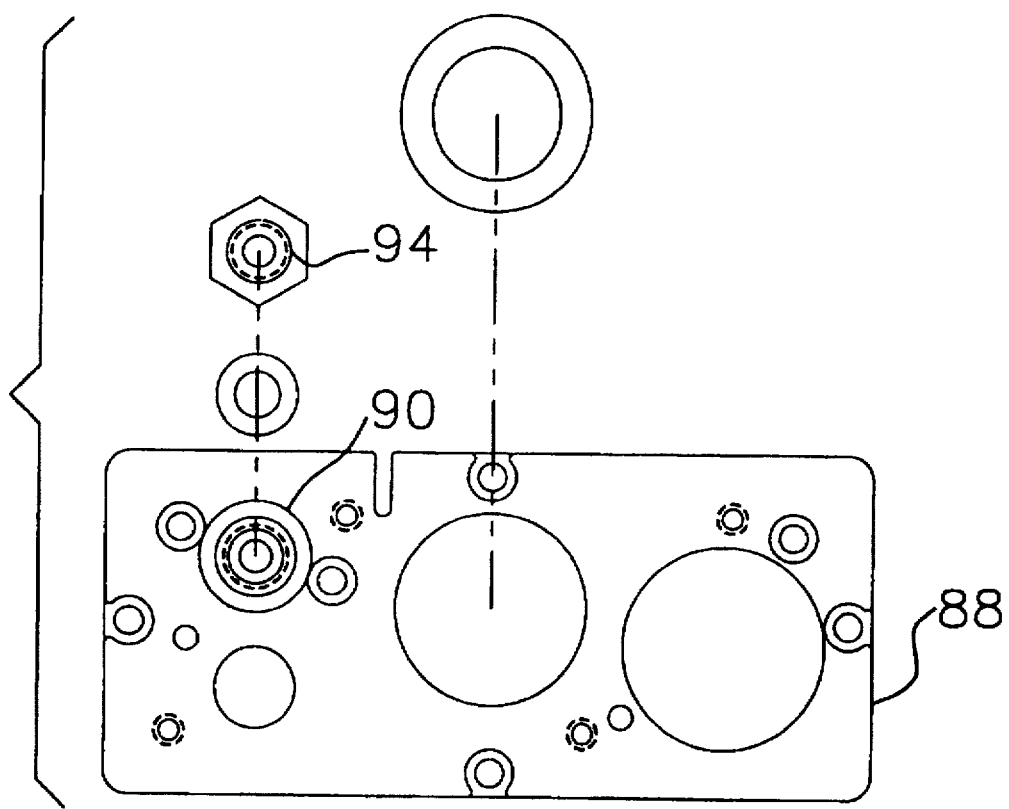
FIG. 6b is an end view of the butt plate.

Coolant flow from the termination 84 of the channel in the electrode plate runs through bore 86 in the mating nonconductive body. A butt plate 88 best seen in FIG. 6 is mounted across the ends of the nonconductive housing and body electrode sandwich. The butt plate incorporates a boss 90 having an internal aperture 92 coincident with the fluid flow path exit from the nonconductive body. The boss receives a fluid fitting 94 and O-ring seal for connection to the coolant recirculating system. The sandwich assembly formed by the electrode plate and nonconductive body provides the minimum weldhead thickness while preserving the requirement for a nonconductive outer surface for the case of the weldhead and a nonconductive electrode for receiving the weldhead rotor. Integrating the flow path for the coolant between the electrode and the nonconductive body also provides the minimum parts count, simplifying the design and maintainability of the weldhead. Fitting 82 is fabricated from conducting material and constitutes the power terminal for the electrode in addition to conducting fluid through conduit. The sandwiched electrode and nonconductive body are mounted to the nonconductive housing constraining the rotor between the electrode plate and nonconductive self-lubricating race. The dome headed plungers, in contact with one surface of the rotor through the apertures through the race, urge the rotor against the electrode for firm contact. The resilient mounting of the plungers accommodates wear in the electrode surface and the rotor surface to ensure extended operability and axial alignment of the weldhead.

The plungers constrained by the hemispherical apertures in the race urge the rotor away from the nonconductive housing. The plungers thereby carry the rotor into firm contact with the electrode plate and provide axial alignment and stability. The race provides radial alignment and stability for the rotor. A groove 39 in the rotor contacts the dome headed plungers while lips 41 surrounding the groove provide sliding contact with the inner and outer periphery of the race.

Figure 7:
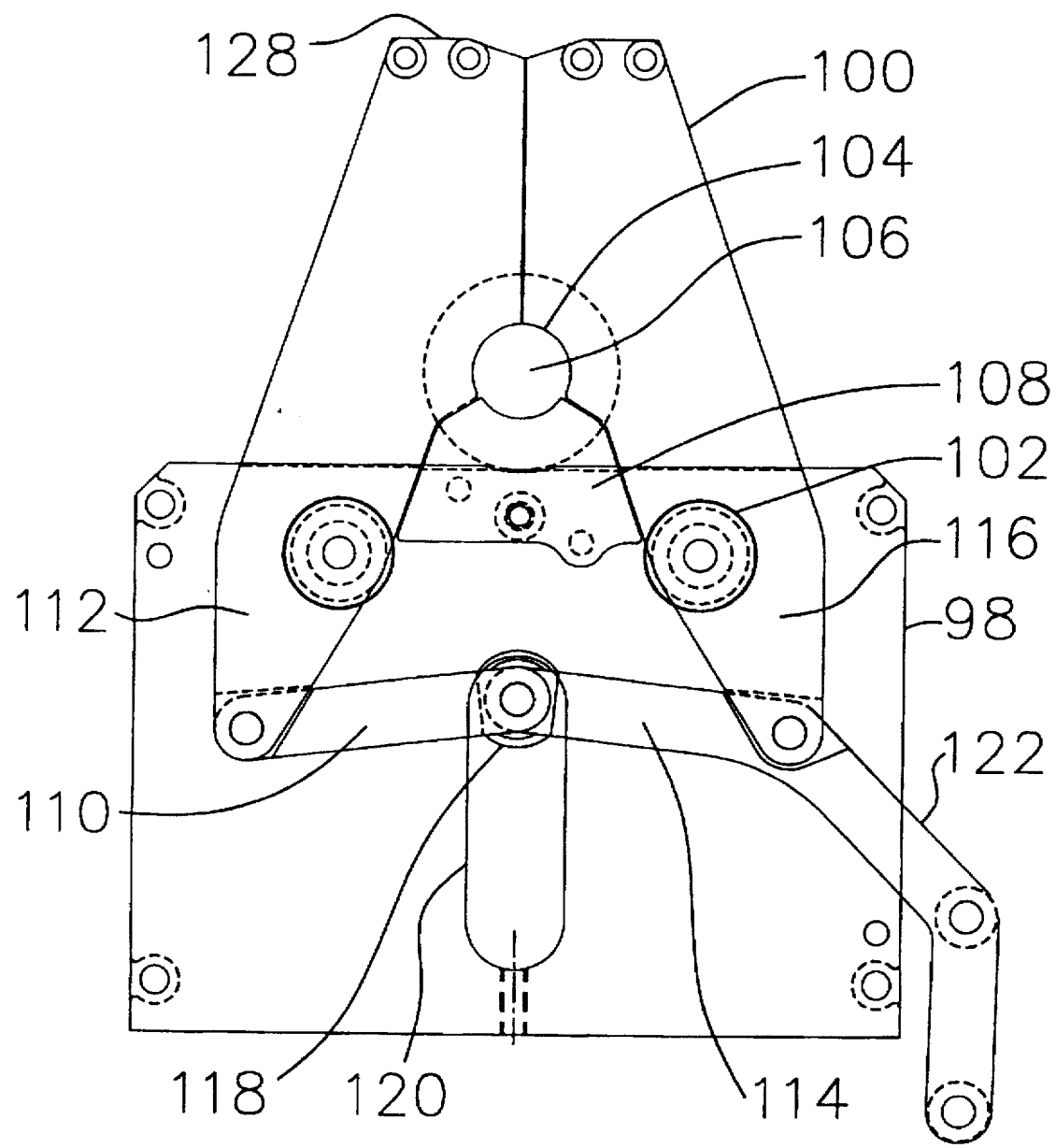
FIG. 7 is a top view of the exoskeletal cover plate and jaw assemblies.

FIG. 7 discloses workpiece constraining jaws which are mounted to the nonconductive housing and body of the weldhead in an exoskeletal arrangement. The jaws mounted on each side of the weldhead incorporate a cover plate which is received over a tail portion of the nonconductive housing or nonconductive body. Jaws 100 are mounted to the cover plate for pivotal motion on bushings 102. Each jaw incorporates an arc segment 104 surrounding a portion of aperture 106 which receives a tubular workpiece. An anvil base 108 is mounted to the cover plate and provides a third arc segment for the tubular workpiece aperture. In the closed position, the jaws and anvil engage and constrain a tubular workpiece for welding. The workpiece aperture 106 is substantially concentric with the workpiece aperture 12 in the weldhead an overcentering linkage for operation of the jaws incorporates a first jaw attachment link 110 attached to a tail piece 112 of one jaw with a pinned connection. The first link is interconnected to a second link 114 which is attached to a tail piece 116 on the second jaw through a pinned connection and to the first link through a pinned connection to a spacer bearing 118 riding in a guide slot 120.

An actuator arm 122 extends from the second link to provide a grasping lever for articulation of the linkage assembly opening and closing the jaws. Placement of the angled lever adjacent the case, as shown in FIG. 7, urges the linkage bearing into the upper position of the slot forcing the links outwardly, bringing the jaws into contact with one another and the anvil. In an opened position, the linkage lever is moved outwardly from the case urging the bearing to the opposite end of the slot from the configuration shown in FIG. 7, drawing the links and, consequently, the tail pieces of the jaws inwardly, thereby separating the jaws for insertion or removal of a workpiece. The anvil additionally provides the ground contact for a workpiece retained in the jaws for welding. Inert gas for the welding process is provided through fitting 120 attached to the nonconductive housing as best seen in FIGS. 1a through 1c. A flow channel 122 formed in the nonconductive housing emerges into a plenum 124 surrounding the drive gears and opening into the workpiece aperture through the rotor race and electrode plate. The electrode plate incorporates machined channels 126, as best seen in FIG. 5b, to assist in collecting debris from the rotor/electrode interface. In the closed position, the jaws and anvil substantially enclose the workpiece aperture in the weldhead and end plates 128, attached to each of the jaws, cooperatively provide a cover for the open bight portion of the weldhead with the jaws in a closed position.

Figure 8:
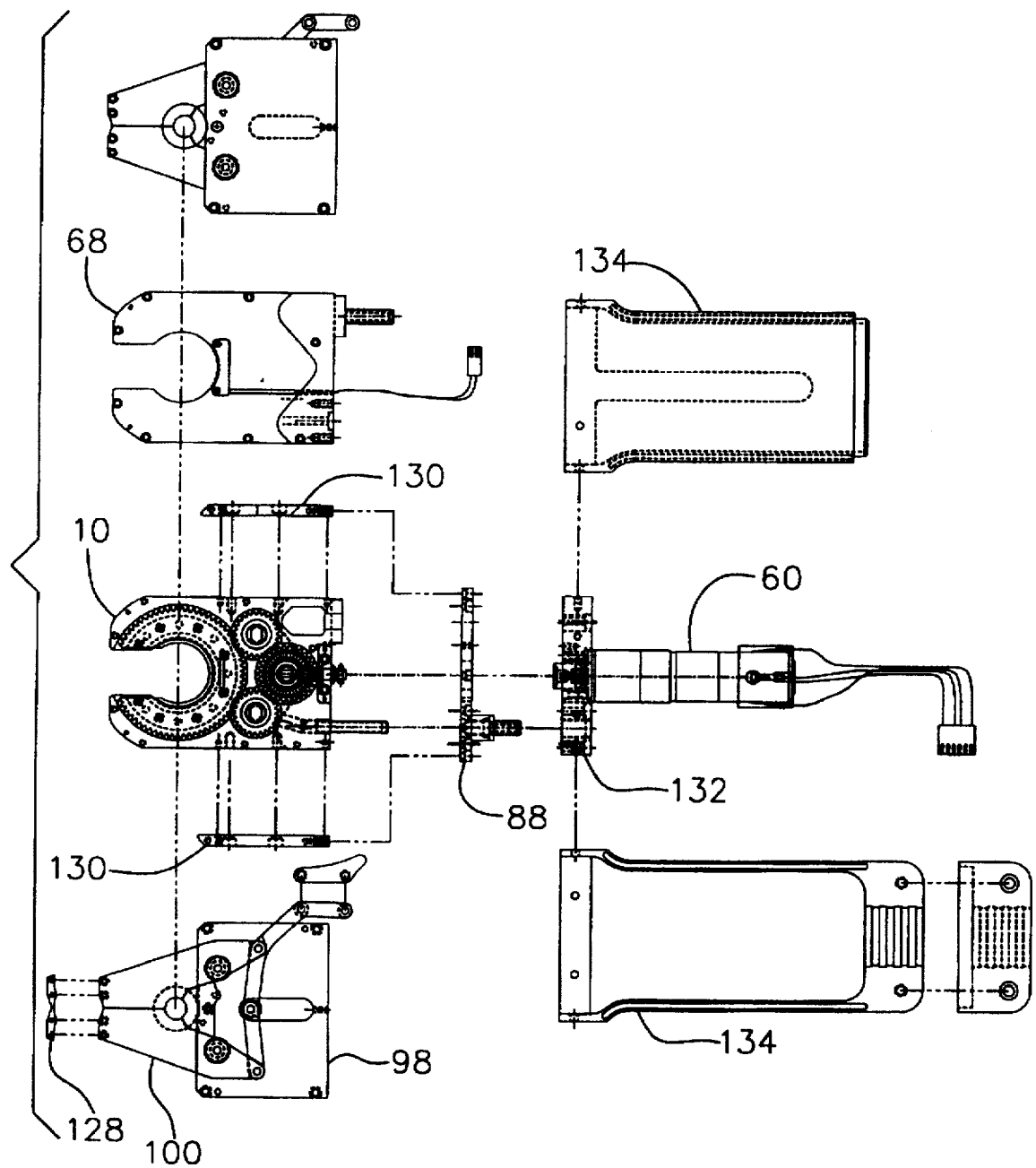
FIG. 8 is a top exploded view of the components for a weldhead incorporating the present invention.

The elements of the entire weldhead assembly are best seen in FIG. 8 which provides an exploded view of the various assemblies. Side plates 130 attached to the nonconductive housing and butt plate provide mounting attachment for the cover plates mounting the workpiece jaws. Forces attributable to mounting of a workpiece in the jaws are thereby carried entirely in the metallic exoskeletal arrangement of the jaws and cover plates, avoiding stress on the nonconductive housing and body of the weldhead. The drive motor is attached through motor mount 132 to the butt plate and clamshell handles 134 enclose the motor and provide ease and handling the weldhead during attachment to tubular workpieces. Attachment for cooling water inlet and outlet including electrical contact for the electrode and inert gas are connected through standard fittings extending through the interior of the clamshell handles.

Having now described the invention in detail as required by the patent statutes, those skilled in the art will recognize modifications and substitutions to the embodiment disclosed herein for particular applications of the invention. Such modifications and substitutions are within the scope and intent of the invention as defined in the following claims.

What is claimed is:

1. An orbital weldhead comprising:
   a nonconductive housing having a substantially circular workpiece aperture with an open bight portion for insertion and removal of a workpiece;
   a nonconductive self-lubricating race mounted in the housing, said race surrounding the workpiece aperture and having an coincident open bight portion;
   a integral cover adapted to mate with the housing with a coincident workpiece aperture and open bight portion and having
      a nonconductive body and;
      an electrode plate secured to the body adjacent the race and having a coincident workpiece aperture and open bight portion, said electrode plate and body cooperatively forming a coolant flow channel surrounding the workpiece aperture;
   a rotor engaged intermediate the race and electrode plate and having an open bight portion aligning with the open bight portions of the housing, cover, race and electrode in a home position, said rotor supporting a welding cathode;
   means for rotating the rotor;
   means for introducing coolant into the coolant flow channel; and
   means for providing power to the electrode plate for welding.

2. An orbital weldhead as defined in claim 1 wherein the coolant flow channel cooperatively formed by the electrode plate and body comprises a serpentine channel machined in a mating face of the electrode plate and a resilient seal surrounding the periphery of the machined surface and engaged between the mating surface of the electrode and a corresponding mating surface of the body.

3. An orbital weldhead as defined in claim 2 wherein the machined flow channel in the electrode plate incorporates at least one wall intermediate portions of the channel, said wall extending beyond the mating surface of the electrode plate and received in a groove in the corresponding mating surface of the body.

4. An orbital weld head as defined in claim 2 wherein the means for introducing coolant into the coolant flow channel includes a boss extending from the electrode plate opposite the mating surface, said boss having a central bore connecting to an aperture extending through the electrode plate into the machined channel.

5. An orbital weldhead as defined in claim 4 wherein the means for providing power to the electrode plate comprises a nonconductive fitting extending from the boss of the electrode plate and wherein the means for introducing coolant further comprises a bore in the fitting opening into the bore in the electrode plate boss.

6. An orbital weldhead as defined in claim 1 wherein the means for rotating the rotor comprises:
   a bevel and spur gear assembly operably connected to a pair of spur gears, said spur gears engaging a plurality of teeth on a peripheral circumference of the rotor;
   a constrained shaft drive assembly having a bevel drive gear engaging the bevel and spur gear assembly said bevel drive gear mounted on a shaft having a first end mounted in a first rotational bearing and constrained by a second rotational bearing with the bevel drive gear intermediate the first end and the second rotational bearing; and
   a drive motor interconnected to the shaft by a pinned coupling opposite the first end.

7. An orbital weldhead as defined in claim 6 wherein the first rotational bearing is mounted proximate an axis of rotation for the bevel and spur gear assembly.

8. An orbital weldhead as defined in claim 6 wherein the pinned coupling incorporates a first pinned attachment to the shaft and a second pinned attachment to a drive shaft extending from the drive motor, said first and second pinned attachments orthogonally oriented.

9. An orbital weldhead as defined in claim 1 further comprising:
   a pair of cover plates oppositely mounted to the nonconductive housing and body, each cover plate pivotally supporting a pair of solid jaws having opposing edges, each edge incorporating an arc segment surrounding a portion of a constraining aperture which receives a tubular work piece, said constraining aperture substantially concentric with the work piece aperture in the nonconductive housing with the jaws in a closed position;

an anvil base mounted to the cover plate intermediate the jaws and including a third arc segment of the constraining aperture;

means for pivoting the jaws from the closed position to an opened position; and means for attaching the cover plates to the nonconductive housing and body.

10. An orbital weld head as defined in claim 9 wherein each jaw includes a tail piece extending from a pivot point opposite a jaw body incorporating the opposing edge and arc segment and wherein the means for actuating the jaws comprises for each pair of jaws:

a first link pinned to the tail piece of one of said pair of jaws;

a second link pinned to the tail piece of a second one of the pair of jaws, said first link and second link interconnected through a pinned connection to a spacer bearing riding in a guide slot in the cover plate; and an actuator arm extending from the second link for articulating the linkage assembly wherein placement of the lever in a first position urges the spacer bearing into a first position in the guide slot, said first position drawing the first and second links inwardly to pivot the tail pieces of the jaw pair inwardly separating the opposing edges of the pair of jaws and moving the lever to the second position urges the bearing to a second position in the slot forcing the links outwardly bringing the opposing edges of the pair of jaws into contact, with the first arc segment and second arc segment of the jaws mating with the third arc segment of the anvil to constrain a tubular work piece therebetween.

11. An orbital weldhead as defined in claim 10 further comprising an end plate extending perpendicularly from each jaw, each end plate cooperatively engaging the end plates extending from the other jaws to provide a cover for the open bight portion of the weldhead with the jaws in the closed position whereby the solid jaws and end plates cooperatively form a chamber enclosing the work piece aperture.

12. An orbital weldhead comprising:

a nonconductive housing having a substantially circular workpiece aperture with an open bight portion for insertion and removal of a workpiece;

a nonconductive self-lubricating race mounted in the housing, said race surrounding the workpiece aperture and having a coincident open bight portion;

an integral cover adapted to mate with the housing with a coincident workpiece aperture and open bight portion and having a nonconductive body and;

an electrode plate secured to the body adjacent the race and having a coincident workpiece aperture and open bight portion, said electrode plate and body cooperatively forming a coolant flow channel surrounding the workpiece aperture;

a rotor engaged intermediate the race and electrode plate and having an open bight portion aligning with the open bight portions of the housing, cover, race and electrode in a home position, said rotor supporting a welding cathode;

a gear train adapted to rotate the rotor;

an inlet adapted to introduce coolant into the coolant flow channel; and a terminal adapted to provide power to the electrode plate for welding.

* * * * *